(12) United States Patent
Lam

(10) Patent No.: US 8,392,371 B2
(45) Date of Patent: Mar. 5, 2013

(54) SYSTEM AND METHOD FOR IDENTIFYING AND MITIGATING REDUNDANCIES IN STORED DATA

(75) Inventor: Wai Lam, Jericho, NY (US)

(73) Assignee: FalconStor, Inc., Melville, NY (US)

( * ) Notice: Subject to any disclaimer, the term of this patent is extended or adjusted under 35 U.S.C. 154(b) by 0 days.

(21) Appl. No.: 13/134,641

(22) Filed: Jun. 13, 2011

(65) Prior Publication Data

US 2011/0258162 A1    Oct. 20, 2011

Related U.S. Application Data

(63) Continuation of application No. 11/894,007, filed on Aug. 16, 2007, now Pat. No. 7,962,499.

(60) Provisional application No. 60/838,760, filed on Aug. 18, 2006.

(51) Int. Cl.
G06F 7/00 (2006.01)
G06F 17/00 (2006.01)

(52) U.S. Cl. ........ 707/644; 707/690; 707/758; 709/219; 714/13; 714/758

(58) Field of Classification Search .......... 707/644, 707/647, 699, 758, E17.01, E17.005, E17.043, 707/690; 709/219; 714/13, 758, E11.03, 714/E11.08, E11.112, E11.118, E11.121
See application file for complete search history.

(56) References Cited

U.S. PATENT DOCUMENTS

| | | | | |
|---|---|---|---|---|
| 4,472,750 A * | 9/1984 | Klumpp et al. | ............ | 360/78.01 |
| 4,734,856 A | 3/1988 | Davis | | |
| 5,020,058 A * | 5/1991 | Holden et al. | ................ | 370/474 |
| 5,029,107 A * | 7/1991 | Lee | ............................... | 345/698 |
| 5,634,052 A | 5/1997 | Morris | | |
| 5,649,196 A | 7/1997 | Woodhill et al. | | |
| 5,668,897 A | 9/1997 | Stolfo | | |
| 5,734,340 A | 3/1998 | Kennedy | | |
| 5,764,987 A * | 6/1998 | Eidt et al. | ...................... | 717/100 |
| 5,963,961 A | 10/1999 | Cannon et al. | | |
| 5,990,810 A | 11/1999 | Williams | | |
| 6,058,298 A | 5/2000 | Stamegna | | |
| 6,085,298 A * | 7/2000 | Ohran | ........................ | 711/162 |
| 6,087,967 A * | 7/2000 | Budnik et al. | ......... | 707/E17.036 |
| 6,571,349 B1 | 5/2003 | Mann et al. | | |
| 6,574,756 B1 | 6/2003 | Walker et al. | | |
| 6,668,262 B1 * | 12/2003 | Cook | .................... | 707/E17.005 |
| 6,865,567 B1 | 3/2005 | Oommen et al. | | |
| 6,931,288 B1 * | 8/2005 | Lee et al. | ...................... | 715/762 |
| 7,055,008 B2 * | 5/2006 | Niles et al. | ..................... | 711/162 |
| 7,058,788 B2 * | 6/2006 | Niles et al. | ..................... | 711/220 |
| 7,155,585 B2 | 12/2006 | Lam et al. | | |

(Continued)

OTHER PUBLICATIONS

David Buttler, Ling Liu, Calton Pu—"A Fully Automated Object Extraction System for the World Wide Web"—2001 IEEE—Distributed Computing Systems, 2001. 21st International Conference on Apr. 2001—(papes 361-370).*

(Continued)

*Primary Examiner* — Anh Ly

(74) *Attorney, Agent, or Firm* — Brandon N. Sklar, Esq.; Kaye Scholer LLP

(57) ABSTRACT

In an example of an embodiment of the invention, a repeating pattern is identified within stored data comprising a plurality of data files, each data file comprising at least a header section and a data section stored in an unknown format. At least one occurrence of the repeating pattern is identified as a header section of a respective data file, and a data section of the respective data file is identified based, at least in part, on a location of the at least one occurrence of the repeating pattern. The identified data section of the respective data file is backed up. Systems are also disclosed.

15 Claims, 11 Drawing Sheets

U.S. PATENT DOCUMENTS

| | | | |
|---|---|---|---|
| 7,266,668 B2 | 9/2007 | Hartung et al. | |
| 7,424,498 B1 | 9/2008 | Patterson | |
| 7,451,168 B1 | 11/2008 | Patterson | |
| 7,529,785 B1 | 5/2009 | Spertus et al. | |
| 7,529,834 B1 | 5/2009 | Birrell et al. | |
| 7,590,808 B2 | 9/2009 | Lam et al. | |
| 7,765,160 B2 | 7/2010 | Niles et al. | |
| 7,954,157 B2 | 5/2011 | Niles et al. | |
| 7,962,499 B2 * | 6/2011 | Lam | 707/758 |
| 8,145,860 B2 | 3/2012 | Lam et al. | |
| 2002/0007428 A1 | 1/2002 | Chilton | |
| 2002/0049883 A1 | 4/2002 | Schneider et al. | |
| 2004/0078630 A1 | 4/2004 | Niles et al. | |
| 2004/0088505 A1 | 5/2004 | Watanabe | |
| 2004/0143713 A1 * | 7/2004 | Niles et al. | 711/162 |
| 2004/0221123 A1 | 11/2004 | Lam et al. | |
| 2005/0027955 A1 | 2/2005 | Lam et al. | |
| 2005/0108486 A1 | 5/2005 | Sandorfi | |
| 2005/0114598 A1 | 5/2005 | Hartung et al. | |
| 2006/0059201 A1 | 3/2006 | Watanabe | |
| 2006/0161593 A1 | 7/2006 | Mori et al. | |
| 2006/0218638 A1 | 9/2006 | Niles et al. | |
| 2006/0218644 A1 | 9/2006 | Niles et al. | |
| 2007/0198659 A1 * | 8/2007 | Lam | 709/219 |
| 2007/0208788 A1 | 9/2007 | Chakravarty et al. | |
| 2007/0271046 A1 * | 11/2007 | Agarwala et al. | 702/57 |
| 2008/0034268 A1 | 2/2008 | Dodd et al. | |
| 2008/0215474 A1 | 9/2008 | Graham | |
| 2009/0182789 A1 * | 7/2009 | Sandorfi et al. | 707/204 |
| 2009/0327318 A1 * | 12/2009 | Peacock | 707/100 |
| 2010/0174731 A1 | 7/2010 | Vermeulen et al. | |
| 2010/0179959 A1 | 7/2010 | Shoens | |
| 2011/0219035 A1 * | 9/2011 | Korsunsky et al. | 707/E17.005 |
| 2011/0231367 A1 | 9/2011 | Niles et al. | |
| 2011/0258162 A1 * | 10/2011 | Lam | 707/647 |

OTHER PUBLICATIONS

Embley et al.—"Conceptual-model-based data extraction from multiple-record Web pages"—Data & Knowledge Engineering 31 (1999) 1999 Elsevier Science B.V. All rights reserved, vol. 31, Issue 3, Nov. 1999, pp. 227-251.*

Daniels et al; "Flight Data Recorder: Monitoring Persistent-State Interactions to Improve Systems Management"—USENIX Association, OSDI'06 7th USENIX Symposium on Operating System Design and Implementation. (pp. 117-130), 2006.

Torbjorn Borison; "Object Synchronization and Security for Mobile Communication Devices"—Ericsson, Royal Institute of Technology, Sep. 20, 2001 (pp. 1-65).

Schleimer, Saul, Wikerson, Daniel S., & Aiken, Alex; "Winnowing: Local Algorithms for Document Fingerprinting"—SIGMOD 2003; Jun. 9-12, 2003, San Diego, CA (pp. 1-10).

IBM International Technical Support Organization "Enterprise Systems Connection (ESCON) Implementation Guide", Chapter 5 ESCON I/O Architecture, pp. 29-34, First Edition, Jul. 1996.

* cited by examiner

SYSTEM AND METHOD FOR IDENTIFYING AND MITIGATING REDUNDANCIES IN STORED DATA

The present application is a continuation of U.S. patent application Ser. No. 11/894,007, which was filed on Aug. 16, 2007 and will issue on Jun. 14, 2011 bearing U.S. Pat. No. 7,962,499, which claims priority from U.S. Patent Application No. 60/838,760, which was filed on Aug. 18, 2006, both of which are assigned to the assignee of the present application and are incorporated by reference herein in their entireties.

FIELD OF THE INVENTION

This invention relates generally to a system and method for storing data. More particularly, this invention relates to a system and method for identifying and mitigating redundancies within stored data.

BACKGROUND OF THE INVENTION

In many computing environments, large amounts of data are written to and retrieved from storage devices connected to one or more computers. For example, many large enterprises maintain local area networks ("LANs") comprising multiple personal computers ("PCs") which are used on a daily basis by employees. Typically, the employees regularly store data on the local disk drives within the PCs. As the amount of data stored on such local disk drives increases, the aggregate value of that data to the organization also increases. Consequently, it is a common practice to back up locally stored data by storing copies of the data on one or more remote, backup storage devices.

In many enterprises, the need to preserve data in backup storage systems generates a large and continuously increasing quantity of data. The increasing quantity of data can represent an ongoing challenge for an enterprise, because storage space requirements typically increase as a function of the quantity of stored data. Accordingly, there is a continuing need for effective and efficient methods for backing up data.

One well-known approach to backing up data is to generate a copy of data stored on a local storage device periodically and transmit the copy to a remote backup storage device. For example, in a large enterprise, such as that described above, data stored on one or more PCs in the network may be copied and transmitted via the network to a dedicated backup storage device located elsewhere on the network (or located outside the network). This procedure (referred to herein as a "backup session") may be performed once per day, for example, or at any other specified interval.

In accordance with one backup strategy, selected data files are designated to be backed up, and a full copy of each designated file is transmitted to the backup storage device during each backup session. Another well-known approach to backing up data is to use an "incremental-and-full" strategy. During relatively frequent "incremental" backup sessions, which may be performed once per day, for example, each designated file is examined and any incremental changes made to the file since the most recent backup session are recorded in the backup storage device. In addition to the incremental backup sessions, "full" backup sessions are performed regularly—once per week, for example. During each "full" backup session, a full copy of each file is transmitted to and stored in the backup storage device.

Regardless of which approach is used to back up data, a typical backup storage system generates a large and increasing amount of data containing a large number of redundancies. In many cases, a file is changed only slightly between full backup sessions. Nevertheless, during each full backup session the entire file may be stored in a new memory location in the backup storage device. As a result, identical copies of the unchanged portions of these files may be stored multiple times in different locations within the backup storage system. The existence of redundancies in stored data within a backup storage system represents an undesirable and inefficient use of resources.

Accordingly, there is a need to reduce or eliminate redundancies in stored data within storage systems. If the format in which data is stored in a storage system is known, and an accurate directory system for the stored data is accessible, redundancies can be identified by using the directory, for example.

However, in some instances the format of the data stored in a storage system may not be known. Because there is no universally accepted format for storing data, a variety of different formats for storing data have been developed, and a variety of different formats are used by vendors of storage systems in their respective products. For example, there exist differences between disk formats used in storage systems offered by Hitachi Data Systems, located in Santa Clara, Calif., and those offered by EMC, located in Hopkinton, Mass. It should also be noted that the formatting and organization of stored data may also be affected by the file system used. For example, there exist differences between the format used by the Microsoft NTFS file system and the UNIX EXT3 file system.

The multiplicity of formats in existing storage systems poses a challenge when a party, or a software application, that is not familiar with the format used in a given storage system, attempts to perform a desired data processing operation with respect to the data stored in the system. For example, if a software application that is selected to eliminate and reduce redundancies within a backup storage system is not familiar with the format used by the system to store data, it will have difficulty performing its designated task. Although the software application may have access to the bits of data stored in the backup storage system, it may have no way to determine where data files begin and end. Even if a desired data file is found, the application may not be able to distinguish the various sections (the header section, the data section, etc.) of the data file.

Without knowledge of the format used by a storage system to store data, it can be challenging to identify and reduce redundancies within the stored data. One solution used in some backup storage systems is to employ a brute force method to locate multiple occurrences of a selected data block within the stored data, and delete all but one (or a few) of the copies. A "sliding window" technique is one such brute force approach. A sliding window is defined to be equal in length to the length of the data block in question. The window is applied to a selected location within the stored data to define a data segment equal in length to the data block. The data block in question is compared to the defined data segment. If the two do not match, the window is shifted by one byte, and another data segment (equal in length to the data block in question) is defined. This new data segment is compared to the data block. If the two do not match, the window is again shifted by one byte, and yet another data segment is defined. This method may be repeated multiple times until the data block is located within the stored data, and may be further repeated to identify additional occurrences of the data block. If multiple occurrences of the data block are found in the stored data, a mechanism to identify and register the duplicate blocks may be applied, and one or more of the copies may be deleted. This method can be very time consuming and inefficient.

Tape Libraries and Virtual Tape Libraries (VTLs)

Tape libraries have long been used in backup storage systems to store data. A tape library typically comprises one or more tapes and a mechanism, such as a tape drive, for reading and writing data on the tape(s). In addition, a backup software application manages the storage of data in the tape library. The backup software handles read and write requests received from client computers in a network and directs the requests to the tape library, for example.

Today, large amounts of data are stored in tape libraries. However, due to the inherent limitations of tape libraries, reading or writing data on a tape is often cumbersome and restrictive. Tape is a sequential medium; consequently it requires more time to access a desired data file stored on a tape than to access a file stored on a random-access medium, such as a disk drive. In addition, many tape libraries comprise mechanical parts used to load tapes, etc., and sometimes require human intervention to identify a desired tape or perform other tasks. Therefore, in many cases, performing a data processing operation on data stored on tape is slower than performing the corresponding operation on a random access medium such as a disk drive. As a result, virtual tape libraries ("VTLs"), which typically use one or more disk drives to store data, are sometimes installed in backup storage systems to replace mechanical tape libraries.

When a VTL is added to a tape library system, read and write requests received after the installation of the VTL are typically directed by the backup software to the VTL for storage. Accordingly, any new data is stored in the VTL. Data stored in the VTL is sometimes stored using the same format used by the original, mechanical tape library. Adopting the same format allows a VTL to replace a mechanical tape library and continue to work with the existing backup software seamlessly, thereby avoiding costly changes to an enterprise's IT infrastructure.

In some cases, however, a backup software application used to store data in a VTL is not familiar with, or incompatible with, the format used to store data on tapes in the original tape library. In these instances, the inability of the backup software application to recognize data in the tape library can be inconvenient and problematic. For example, migrating data from a tape library to a VTL can be challenging when the backup software application used to store data in the VTL is not familiar with the format of the data stored in the tape library.

Use of Digests

In a variety of applications relating to the transmission and storage of data (including data security systems, data encryption systems, etc.), an ongoing need exists to represent data in an alternate form in such a way that the original data may be recovered. One approach that is commonly used involves the use of a known function to generate, for a respective data block, a value (often referred to as a "digest") that represents the contents of the data block. The digest may be stored or transmitted and subsequently retrieved and processed to recover the data original block.

To be practical, a digest should be substantially smaller than the original data block. Ideally, each digest is uniquely associated with the respective data block from which it is derived. A function which generates a unique digest for each data block is said to be "collision-free." In practice, it is sometimes acceptable to utilize a function that is substantially, but less than 100%, collision-free. A digest-generating function is referred to herein as a D-G function.

Any one of a wide variety of functions can be used to generate a digest. For example, one well-known D-G function is the cyclic redundancy check (CRC). Cryptographically strong hash functions are also often used for this purpose. A hash function performs a transformation on an input and returns a number having a fixed length—a hash value. Several well-known hash functions include the ability to (1) take a variable-sized input and generate a fixed-size output, (2) compute the hash relatively easily and quickly for any input value, and (3) be substantially (or "strongly") collision-free. Examples of hash functions satisfying these criteria include, but are not limited to, the message digest 5 (MD5) algorithm and the secure hash (SHA-1) algorithm.

The MD5 algorithm generates a 16-byte (128-bit) hash value. It is designed to run on 32-bit computers. MD5 is substantially collision-free. Using MD5, hash values may be typically generated at high speed. The SHA-1 algorithm generates a 20-byte (160-bit) hash value. The maximum input length of a data block to the SHA-1 algorithm is $2^{64}$ bits (~$1.8 \times 10^{19}$ bits). The design of SHA-1 is similar to that of MD5, but because its output is larger, it is slightly slower than MD5, although it is more collision-free.

SUMMARY OF THE INVENTION

In one embodiment of the invention, methods and systems are provided for identifying structures, such as data files, within stored data, when the format of the stored data is unknown, or when the format is known but no means is available to process data organized in accordance with the format. For example, the methods and systems described herein may be used to analyze data stored on tapes in a tape library when the format of the stored data is unknown, and/or to migrate the data from the tape library to a virtual tape library (VTL) in an efficient manner.

In one example, a selected portion, or portions, of data stored in a storage system are examined to identify a pattern. The pattern may comprise a recurring arrangement of numerical and alphanumeric values identifiable as a header section of a data file, for example. After a pattern is identified, and it is determined that the pattern represents a component of a data file, an association is determined between a selected data block within the stored data and a component of a data file, based at least in part, on a location of the pattern. For example, a data block located between two occurrences of a header section may be identified as a data section of a data file.

In one example, after a recurring pattern is identified within data stored in the storage system, a data section containing data associated with a data file is identified within the stored data, based on the locations of one or more of the patterns. The identified data section is retrieved from the storage system and stored in a second storage location.

In accordance with an embodiment of the invention, a method to manage data is provided, wherein a repeating pattern is identified within stored data comprising a plurality of data files, in which each data file comprises at least a header section and a data section stored in an unknown format. At least one occurrence of the repeating pattern is identified as a header section of a respective data file, and a data section of the respective data file is identified based, at least in part, on a location of the at least one occurrence of the repeating pattern. The identified data section of the respective data file is backed up.

In one example, the pattern comprises a sequence. The stored data may be maintained on a tape storage medium.

In another example, a first digest representing the identified data section is generated, and the first digest is compared to a set of second digests. If the first digest is not found in the set of second digests, the first digest is added to the set of second digests, the identified data section is backed up, and the identified data section is replaced in the stored data by the first digest.

In another example, a first digest representing the identified data section is generated, and the first digest is compared to a set of second digests. If the first digest is found in the set of second digests, the identified data section is replaced in the stored data by the first digest.

In accordance with an embodiment of the invention, a method to manage data is provided. A repeating pattern is identified in data stored in a storage system, and the pattern is associated with at least a first component of a data structure within the stored data. At least a second component of the data structure is identified, based at least in part on the pattern, and a selected data processing operation is performed with respect to the data structure.

In one example, the pattern appears in a first location and repeats in at least a second location within the data. The pattern may indicate at least one characteristic of the first component chosen from the group consisting of: a location of the first component, a structure of the first component, and a length of the first component. The data may be stored in a storage system, in an unknown format. The storage system may comprise a tape library.

In one example, the data structure comprises at least one data file, and the first component comprises a header section of the at least one data file. The pattern indicates a characteristic of the header section chosen from the group consisting of: a beginning of the header section and an end of the header section. The second component comprises a data section of the at least one data file.

The method may further comprise storing at least a portion of the data structure in a second storage system. The method may also comprise backing up the at least a portion of the data structure in the second storage system.

In one example, the first component is stored at a first location. In this example, at least one indicator of the second component is compared to a set of second indicators. If the at least one indicator of the second component is not found in the set of second indicators, the at least one indicator of the second component is stored, at least a portion of the data structure is stored in a second storage location, and the at least a portion of the data structure stored in the storage system is replaced by the at least one indicator of the second component.

In another example, the at least one indicator of the second component comprises a first digest representing the second component. The first digest is compared to a set of second digests. If the first digest is not found in the set of second digests, the first digest is stored, at least a portion of the data structure is stored in a second storage location, and the at least a portion of the data structure stored in the storage system is replaced by the first digest.

The pattern may comprise a format of the data. The pattern may comprise a sequence of values. The sequence of values may repeats identically within the data. Each occurrence of the pattern may comprise a sequence of bits or a sequence of bytes.

In one example, at least a second component of the data structure is identified, based at least in part on a location of the pattern.

In another embodiment of the invention, a method to manage data structures is provided. A repeating pattern is identified within data stored in a first storage system, and a data section associated with a data file stored in the first storage system is identified, based at least in part on a location of the pattern. A value is computed based at least in part on the data section, and the computed value is compared to one or more second values stored in a database. If the computed value is not found in the database, the computed value is stored in the database, the data section is stored in a second storage system, and the data section stored in the first storage system is replaced by the computed value. If the computed value is found in the database, the data section stored in the first storage system is replaced by the computed value.

In one example, the pattern appears in a first location and repeats in at least a second location within the data. The pattern may comprise a header section of the data file, for example. Alternatively, the pattern may comprise the data section of the data file. The value may comprise a hash value, for example.

The first storage system may comprise a virtual tape library. Each occurrence of the pattern may comprises a sequence of bits or a sequence of bytes.

In another embodiment of the invention, an apparatus to manage data structures is provided. The apparatus comprises means for identifying a repeating pattern in data stored in a storage system, means for associating the pattern with at least a first component of a data structure within the stored data, and means for identifying at least a second component of the data structure, based at least in part on a location of the pattern. The apparatus also comprises means for performing a selected data processing operation with respect to the data structure.

In another embodiment of the invention, a system to manage data structures is provided. The system comprises a memory located in a storage system. The memory is configured to store data. The system also comprises a processor configured to identify a repeating pattern in the data, and associate the pattern with at least a first component of a data structure within the stored data. The processor is further configured to identify at least a second component of the data structure, based at least in part on the pattern, and perform a selected data processing operation with respect to the data structure.

In another embodiment of the invention, a system to manage data structures is provided. The system comprises a memory located in a first storage system, the memory being configured to store data. The system also comprises a processor configured to identify a repeating pattern within data stored in the first storage system, and identify a data section associated with a data file stored in the first storage system, based at least in part on a location of the pattern. The processor is further configured to compute a value based on the data section, and compare the computed value to one or more second values stored in a database. The processor is also configured to store the computed value in the database, store the data section in a second storage system, and replace the data section stored in the first storage system by the computed value, if the computed value is not found in the database. The processor is further configured to replace the data section stored in the first storage system by the computed value, if the computed value is found in the database.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION OF THE PREFERRED EMBODIMENTS

In one example of an embodiment of the invention, methods and systems are provided for identifying structures, such as data files, within stored data, when the format of the stored data is unknown, or when the format is known but no means is available to process data organized in accordance with the format. For example, the methods and systems described herein may be used to analyze data stored on tapes in a tape library when the format of the stored data is unknown, and/or to migrate the data from the tape library to a virtual tape library (VTL) in an efficient manner.

In one example, a selected portion, or portions, of data stored in a storage system are examined to identify a pattern. The pattern may comprise a recurring arrangement of numerical and alphanumeric values identifiable as a header section of a data file, for example. Alternatively, a pattern may comprise a specific sequence of bits or bytes at a stored data block level. After a pattern is identified, and it is determined that the pattern represents a component of a data file, an association is determined between a selected data block within the stored data and a component of a data file, based at least in part, on a location of the pattern. For example, a data block located between two occurrences of a header section may be identified as a data section of a data file.

The methods and systems described herein may be used for a variety of purposes. For example, the methods and systems described herein may be used in a data reduction system to identify and reduce redundancies in data stored in a storage system. In this example, after a recurring pattern is identified within data stored in the storage system, a data section containing data associated with a data file is identified within the stored data, based on the locations of one or more of the patterns. The identified data section is retrieved from the storage system, and a hash value is computed based on the retrieved data section. The computed hash value is compared to hash values stored in a hash table. If the computed hash value is not found in the hash table, the data section is stored in a database (referred to as a "uniform data repository" or "UDR"). The computed hash value is stored in the hash table, and the data section stored in the storage system is replaced with the computed hash value, thereby reducing the amount of space required to store that data section.

Figure 1:
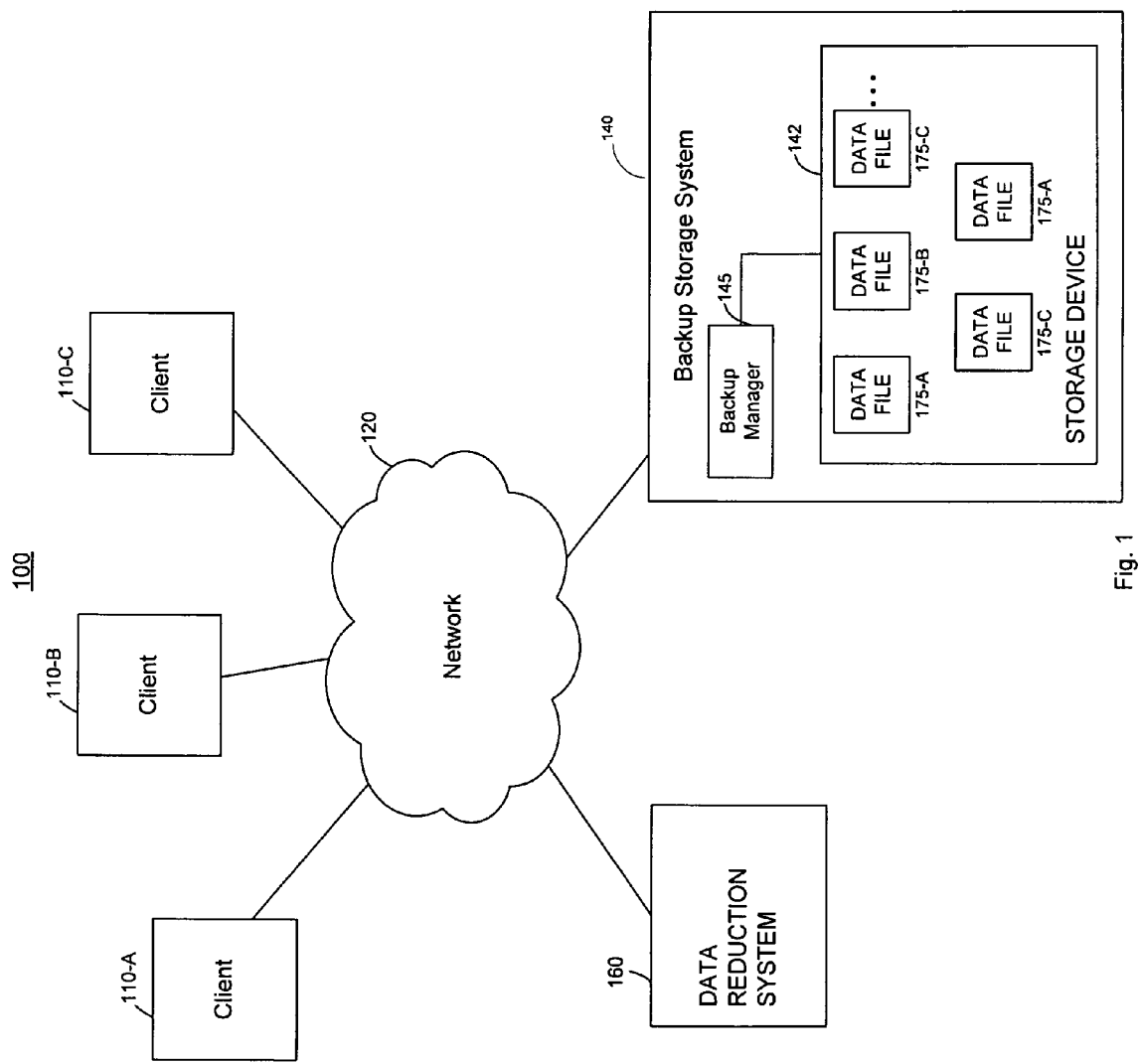
FIG. 1 is a block diagram of an example of a system that may be used to store data, in accordance with an embodiment of the invention.

FIG. 1 is a block diagram of an example of a system 100 that may be used to store data, in accordance with an embodiment of the invention. The system 100 comprises a backup storage system 140, a data reduction system 160, a network 120, and one or more clients 110. In the example of FIG. 1, three clients 110-A, 110-B, and 110-C are shown; however, in other examples the system 100 may comprise any number of clients.

The clients 110-A, 110-B, and 110-C transmit data to the backup storage system 140 for the purpose of backing up the data. Each of the clients 110-A, 110-B, and 110-C may comprise a computer, such as a personal computer, a server computer, etc. Each client 110 may comprise a local storage device, such as a disk drive, used to store data; however, in alternative examples, some or all of the clients 110 do not include any means of storing data locally. Alternatively, a client 110 may comprise any type of device capable of communicating with the backup storage system 140 via the network 120.

In one example, a software application referred to as a "backup agent" (not shown) may reside on each client 110 and manage the backup of data stored in the respective client's local storage. In this example, the backup agent from time to time retrieves data from the respective client's local storage and transmits the data to the backup storage system 140 accompanied by a request to back up the data. In another example, a user at a client 110 may cause selected data to be transmitted to the backup storage system 140 with instructions to back up the data.

The network 120 may comprise any one of a number of different types of networks. In one example, communications are conducted over the network 120 by means of IP protocols. In another example, communications are conducted over the network 120 by means of Fibre Channel protocols. Thus, the network 120 may comprise, for example, an intranet, a local area network (LAN), a wide area network (WAN), an interne, Fibre Channel storage area network (SAN) or Ethernet. Alternatively, the network 120 may comprise a combination of different types of networks.

The backup storage system 140 backs up data received from the clients 110-A, 110-B, and 110-C. The backup storage system 140 may comprise any type of storage system capable of receiving data from the clients 110 and storing the data. The backup storage system 140 may comprise one or more computers and one or more storage devices, for example.

In the example of FIG. 1, the backup storage system 140 comprises a backup manager 145, which is connected to one or more storage devices 142. In this example, one storage device 142 is shown; however, it should be understood that the storage system 140 may comprise any number of storage devices.

The backup manager 145 manages the storage of data files on, and the retrieval of data files from, the storage device 142. The backup manager 145 processes input/output (I/O) requests from the network 120, and sends I/O commands to the storage device 142. In the embodiment of FIG. 1, the backup manager 145 comprises a software application residing on a computer, such as a server computer. Alternatively, the backup manager 145 may comprise hardware, or a combination of software and hardware.

The storage device 142 may comprise a tape drive, for example. In one example, the storage device 142 may operate as part of a tape library. Alternatively, the storage device 142 may comprise a virtual tape library (VTL). However, it should be noted that in alternative examples, the storage device 142 may comprise any type of device capable of storing data files, including, without limitation, one or more disk drives, optical disks, etc.

The backup manager 145 from time to time receives request from the clients 110 to back up selected data files. In response, the backup manager 145 may back up the data files by storing the data files in the storage device 142. For example, referring to FIG. 1, the storage device 142 stores data files 175-A, 175-B, and 175-C. In some cases, the backup manager 145 may store multiple copies of a data file in the storage device 142 as a result of the current backup strategy or for other reasons. In the example of FIG. 1, the storage device 142 holds two copies of the data file 175-A and two copies of the data file 175-C.

The data reduction system 160 examines data stored in the backup storage system 140 and identifies redundancies within the stored data. The data reduction system 160 processes the data stored in the backup storage system 140 to reduce the redundancies identified therein. In the example of FIG. 1, the data reduction system 160 communicates with the backup storage system 140 via the network 120.

Figure 2:
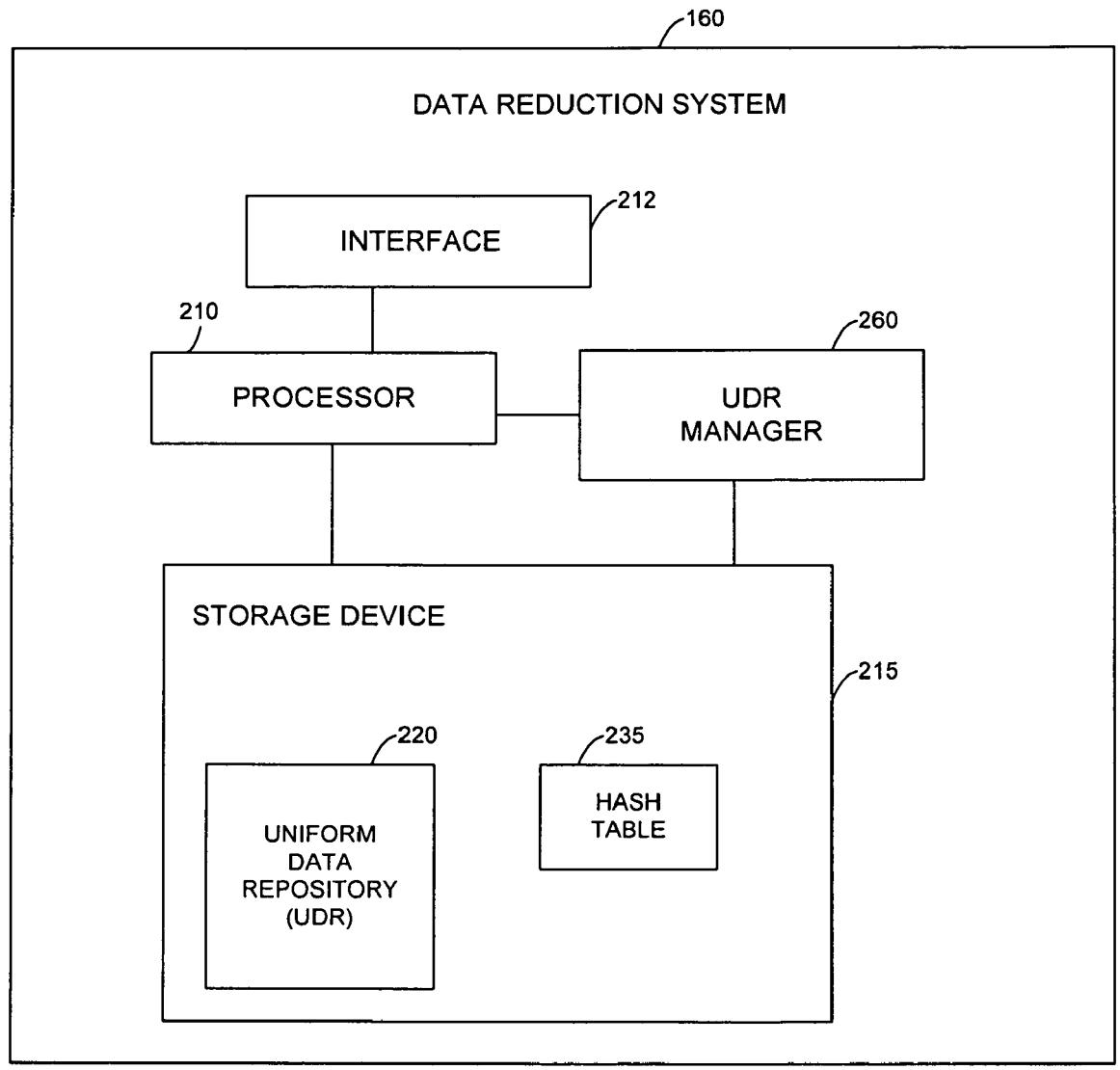
FIG. 2 is a block diagram of an example of components of a data reduction system, in accordance with an embodiment of the invention.

FIG. 2 shows an example of components of the data reduction system 160, in accordance with an embodiment of the invention. In this example, the data reduction system 160 may comprise a computer, such as a personal computer (PC), a server computer, etc. The data reduction system 160 comprises a processor 210, an interface 212, a uniform data repository manager ("UDR manager") 260, and a storage device 215.

The processor 210 orchestrates the activities of the various components of the data reduction system 160, including the handling of data processing commands received from the network 120. In one example, the processor 210 comprises one or more software applications. In an alternative example, the processor 210 may comprise a central processing unit (CPU). In one example, communications between the processor 210 and the network 120 are conducted in accordance with IP or Fibre Channel protocols. Accordingly, the processor 210 receives from the network 120 data processing requests formatted according to IP or Fibre Channel protocols.

The interface 212 provides a communication gateway through which data may be transmitted between the processor 210 and the network 120. The interface 212 may comprise a number of different mechanisms, such as one or more SCSI cards, enterprise systems connection cards, fiber channel interfaces, modems, network interfaces, or a network hub.

The storage device 215 is used by the processor 210 to store data. For example, the processor 210 may store various data files in the storage device 215, and various tables containing information relating to the stored data files. In the example of FIG. 2, the storage device 215 may comprise a disk drive, for example. However, in alternative examples, the storage device 215 may comprise any type of device capable of storing data files, including, without limitation, a magnetic tape drive, optical disk, etc. It should also be understood that while one storage device 215 is shown in FIG. 2, the data reduction system 160 may comprise any number of storage devices.

In an alternative example, the data reduction system 160 may communicate with the backup storage system 140 via a direct link (rather than via the network 120). In yet another example, the data reduction system 160 may be incorporated into the backup storage system 140.

In one example, the data reduction system 160 may dynamically allocate disk space according to a technique that assigns disk space to a virtual disk drive as needed. The dynamic allocation technique functions on a drive level. In such instances, the storage device 215 may be defined as one or more virtual drives. The virtual drive system allows an algorithm to manage a "virtual" disk drive having assigned to it an amount of virtual storage that is larger than the amount of physical storage actually available on a single disk drive. Accordingly, large disk drives can virtually exist on a system without requiring an initial investment of an entire storage subsystem. Additional storage may then be added as it is required without committing these resources prematurely. Alternatively, a virtual disk drive may have assigned to it an amount of virtual storage that is smaller than the amount of available physical storage.

Figure 3A:
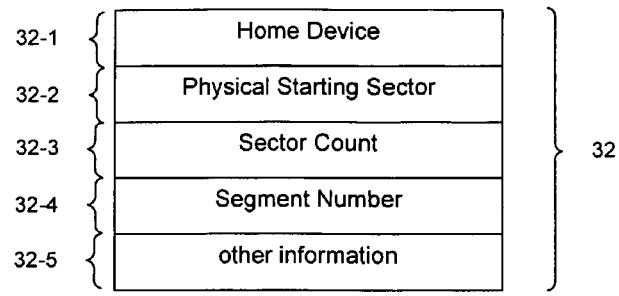
FIG. 3A is a schematic diagram of an example of a segment descriptor, in accordance with an embodiment of the invention.

According to this approach, when the processor 210 initially defines a virtual storage device, or when additional storage is assigned to the virtual storage device, the disk space on the available storage device(s) is divided into segments. Each segment has associated with it segment descriptors, which are stored in a free list table in memory. Generally, a segment descriptor contains information defining the segment it represents; for example, the segment descriptor may define a home storage device location, a physical starting sector of the segment, a sector count within the segment, and a segment number. FIG. 3A illustrates schematically the contents of a segment descriptor 32. Fields 32-1 through 32-5 contain data indicating, respectively, on which storage device the segment is located, the segment's starting physical address, the segment's size, a segment identifier, and other information which may be useful for identifying and processing the segment.

Figure 3B:
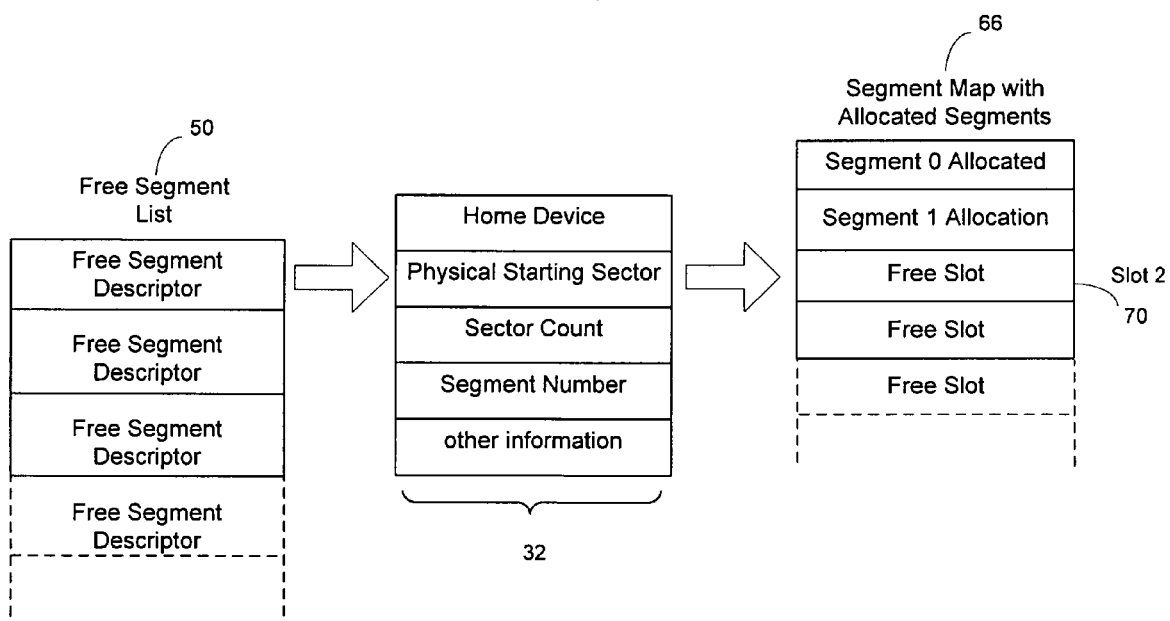
FIG. 3B shows examples of a free segment list, a segment descriptor, and a segment map used to manage data in accordance with a dynamic disk space allocation technique, in accordance with one embodiment of the invention.

Referring to FIG. 3B, as segments are needed to store data, the next available segment descriptor, such as the segment descriptor 32, for example, is identified from the free segment list 50, the data is stored in the segment, and the segment descriptor 32 is assigned to a new table here called a segment map 66. The segment map 66 maintains information representing how each segment defines the virtual storage device. More specifically, the segment map provides the logical sector to physical sector mapping of a virtual storage device. After the free segment descriptor 32 is moved or stored in the appropriate area of the segment map 66, which in this example is slot 2 (70), the descriptor is no longer a free segment but is now an allocated segment. A detailed description of this method for dynamically allocating disk space can be found in U.S. patent application Ser. No. 10/052,208, entitled "Dynamic Allocation of Computer Memory," which was filed on Jan. 17, 2002, was published on Jul. 17, 2003 as Publication No. US 2003-0135709 A1, issued as U.S. Pat. No. 7,058,788, is assigned to the assignee of the present invention, and is incorporated herein by reference in its entirety.

To facilitate the storage of data, the processor 210 in the data reduction system 160 may maintain one or more databases in the storage device 215 in the form of a file object database comprising a file directory structure containing files and folders. The technique of storing data in object oriented databases is well-known. Within a file object database, file objects are data structures that contain the actual data that is within the corresponding file and metadata associated with the file. If multiple versions of a file exist, the versions are all stored within the same file object. One example of a file object database that may be used by the processor 210 to store data in the storage device 215 is described in U.S. patent application Ser. No. 11/657,283 entitled "Method and System for Storing Data," which was filed on Jan. 24, 2007, was published as U.S. Patent Application No. 2007/0198659, and claims the priority of U.S. Patent Application No. 60/762,058 filed on Jan. 25, 2006 (the "'058 Application"), which are assigned to the assignee of the present invention and are incorporated herein by reference in their entireties. Alternatively, the processor 210 may store data using a relational database or any other appropriate data structure.

The processor 210 in the data reduction system 160 may also store data in the form of a virtual tape library (VTL). A VTL, which may comprise one or more disk drives, for example, is sometimes used to replace an existing mechanical tape library. In such a case, the VTL may be used to store data retrieved from the tape library using the same format used by the original tape library. Adopting the same format allows the VTL to replace the mechanical tape library and continue to work with the existing backup software seamlessly, thereby avoiding costly changes to an enterprise's IT infrastructure.

Therefore, in an example in which the backup storage system 140 comprises a tape drive operating as part of a tape library, the data reduction system 160 may retrieve data from the backup storage system 140 and store the retrieved data in a VTL. An example of a method and system to store data in a VTL is described in U.S. patent application Ser. No. 11/893,827, entitled "System and Method for Storing Data and Accessing Stored Data," which was filed on Aug. 16, 2007, was published as U.S. Patent Publication No. 2008/0046670 A1, which claim the priority of U.S. Provisional Patent Application No. 60/838,918, filed on Aug. 18, 2006 (the "'918 Application"), which are assigned to the assignee of the present invention and is incorporated herein by reference in their entireties.

The processor 210 in the data reduction system 160 may additionally enable the clients 110-A, 110-B, and 110-C to access the data files stored in the VTL directly. An example of a method and system to enable client devices to access data files stored in a VTL used in a backup storage system is described in the '918 Application, discussed above.

Operation of the System

Figure 4:
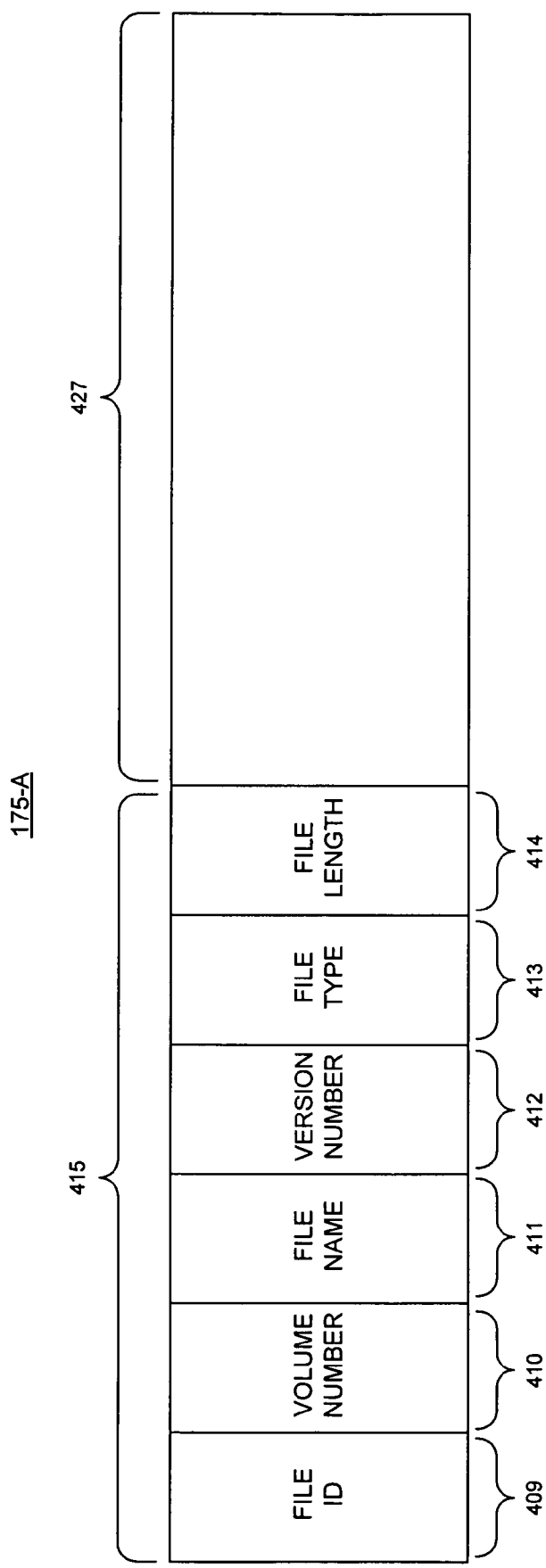
FIG. 4 is an example of a format that may be used to store a data file.

A storage system, such as the backup storage system 140, stores data in one or more selected formats. FIG. 4 is an example of a format that may be used to store a data file such as the data file 175-A (shown in FIG. 1). The data file 175-A comprises a header section 415 and a data section 427. In this example, the header section comprises fields 409-414, each of which contains information defining various attributes of the data file 175-A. Such information is sometimes referred to as "metadata." Field 409 holds a file identifier. Field 410-412 comprise a volume number, file name, and version number, respectively. Filed 413 stores information indicating a file type associated with the data file 175-A. Field 414 holds information indicating the length of the data file 175-A. It should be understood that FIG. 4 is illustrative in nature. While the header section 415 as shown in FIG. 4 comprises the six fields 409-414, in other examples a header section may comprise any number of fields. Also, in other examples the respective fields of a header section may hold information different from that shown in FIG. 4. Also, in other examples a data file may have a structure different from that shown in FIG. 4. For example, a data file may not have a header section but store metadata elsewhere, such as at the end of the data file.

The data file 175-A also comprises a data section 427 which stores data associated with the data file. The data section 427 may comprise a fixed-length data section or a variable-length data section.

As mentioned above, the format shown in FIG. 4 is merely an example of a format that may be used to store data. In practice there is no universally accepted format for storing data, and the format used on a given storage device may depend on various factors including the original vendor of the device.

As mentioned above, the multiplicity of formats in existing storage systems poses a challenge when a party, or a software application, that is not familiar with the format used in a given storage system attempts to perform a desired data processing operation with respect to the data in the system. For example, in some cases a backup storage application may need to determine where a selected data file is stored in the system, and whether it is stored more than once, but is not familiar with the format used by the system to store data. In such cases, although the backup storage application may have access to the bits of data stored in the system, it may have no way to determine where data files begin and end. Without knowledge of the format used to store the data, the application cannot efficiently locate a desired data file stored in the storage system. Even if a desired data file is found, the application may not be able to distinguish the various sections (the header section, the data section, etc.) of the data file.

One solution used in some backup storage systems is to use the "sliding window" method, which is discussed above, to locate a desired data block within stored data. As mentioned above, the "sliding window" method can be very inefficient.

In accordance with an embodiment of the invention, an improved method is provided to identify and reduce redundancies within data stored in a backup storage system. The method described herein may be applicable, for example, when the format used in the backup storage system is unknown. In accordance with this method, data stored in the storage system is examined to identify characteristics of the format and structure of the data, such as patterns that may be indicative of the location, structure, and length of components (such as header sections and/or data sections) within data files stored in the stored data. For example, the stored data may be examined to identify any patterns that indicate the beginning or end of a header section with a data file, or the beginning or end of a data section within a data file. The stored data may also be examined in an attempt to identify any metadata or object attributes (such as an Object ID) that may be indicative of the location, structure or length of components within data files in the stored data. This examination may be performed manually. Alternatively, the examination may be performed automatically. For example, the examination may be performed by a specialized software application, which may be incorporated into the processor 210 of the data reduction system 160.

Figure 5A:
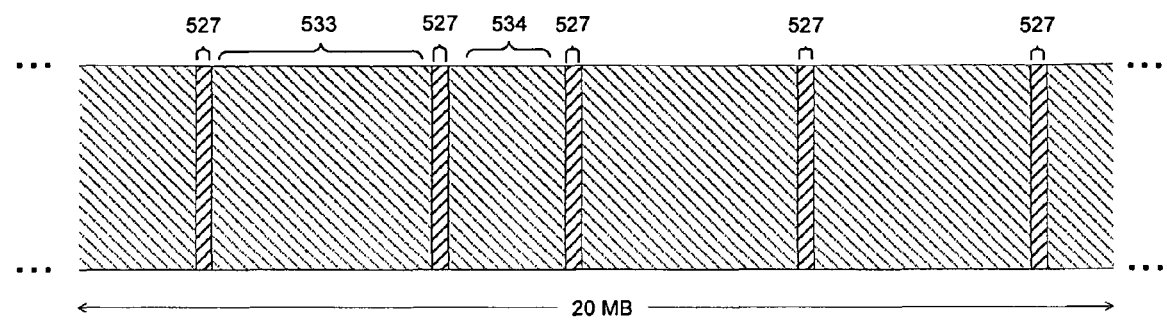
FIG. 5A is an example of data containing a regularly occurring pattern, in accordance with an embodiment of the invention.
Figure 5B:
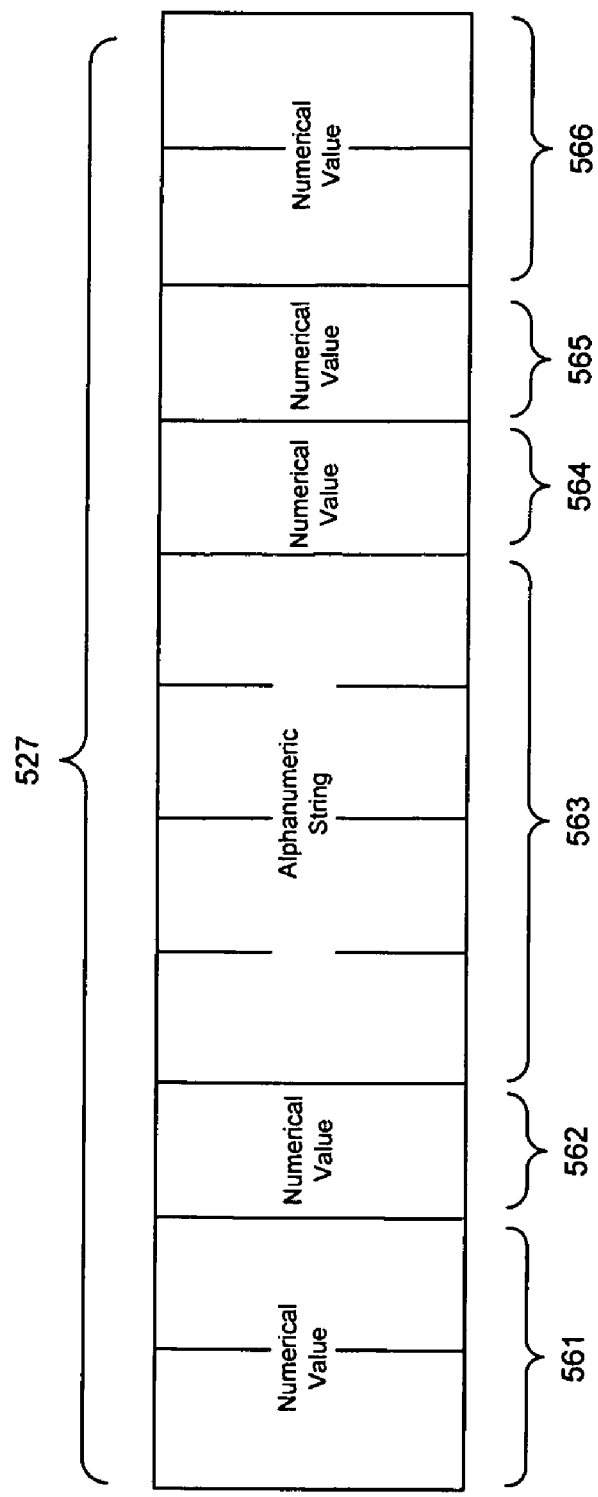
FIG. 5B shows the identified pattern of FIG. 5A in greater detail.

FIG. 5A is an example of data containing a regularly occurring data pattern 527, in accordance with an embodiment of the invention. In this example, after twenty megabytes (20 MB) of memory space within the backup storage system 140 are examined, it is determined that the data pattern 527 comprising a sequence of eleven bytes occurs at five different locations within the data. FIG. 5B shows the identified data pattern 527 of FIG. 5A in greater detail. The eleven-byte pattern 527 comprises a two-byte block 561 containing a numerical value, and a single byte 562 storing a numerical value, a four-byte block 563 containing an alphanumeric string, a single-byte block 564 containing a numerical value, another single-byte block 565 containing a numerical value, and a two-byte block 566 containing a numerical value. For the purpose of identifying the pattern 527, determining the exact numerical values stored in the single bytes and multiple-byte blocks 561-566 within each occurrence of the pattern 527 is less important than recognizing the existence and structure of the recurring pattern.

The identified patterns are used to facilitate the identification of various sections within data files in the stored data. In particular, the patterns may enable the identification of a data section of a data file, as opposed to a header section or other metadata, for example.

In the illustrative example, a determination is made that the eleven-byte data pattern 527 represents a header section of a data file. Therefore, in this example, an additional determination is made that data stored between two consecutive eleven-byte patterns represents a data section associated with a data file. For example (referring again to FIG. 5A), the data block 533 between the first and second occurrences of the data pattern 527 is determined to be a data section associated with a data file.

It should be noted that the pattern shown in FIG. 5B is merely illustrative in nature. In other examples, different types of patterns may be identified. Also in other examples, a header section may comprise more or fewer bytes of data than is shown in FIG. 5B. Indeed, in many cases, a header section may include a significantly greater amount of data.

Figure 6:
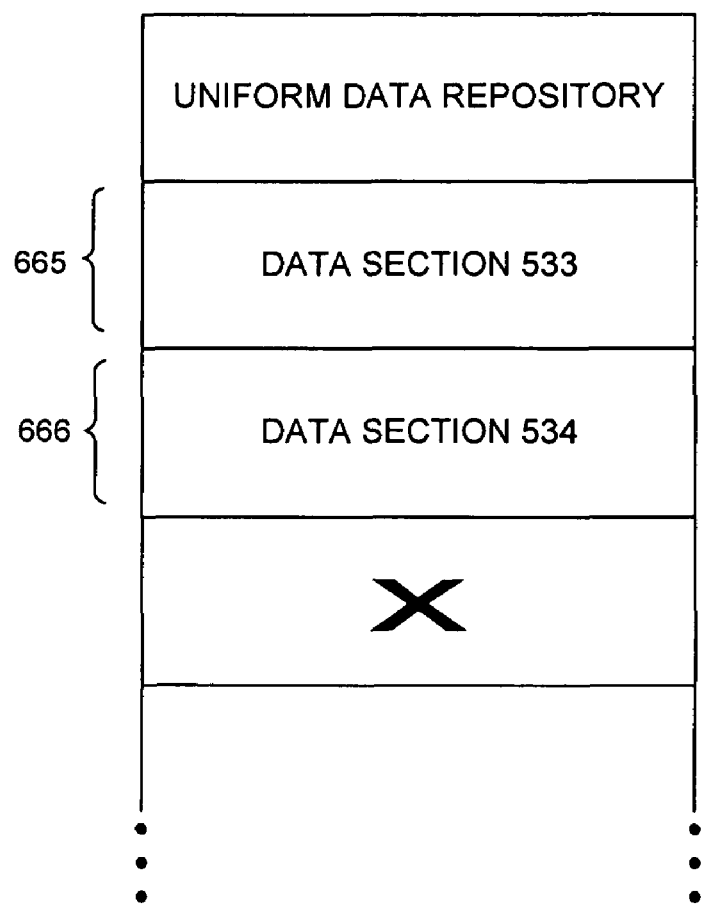
FIG. 6 is an example of a uniform data repository (UDR), in accordance with an embodiment of the invention.

After the stored data has been examined, the UDR manager 260 (in the data reduction system 160) initiates a database, referred to as a uniform data repository (UDR), to store data files received from the backup storage system 140. FIG. 6 is an example of a UDR 220 that may be used to store data, in accordance with an embodiment of the invention. In this example, the UDR manager 260 stores the UDR 220 in the storage device 215, as shown in FIG. 2. The UDR 220 is initiated as a database to store various data blocks; however, at this point the UDR 220 does not contain any data.

Figure 7:
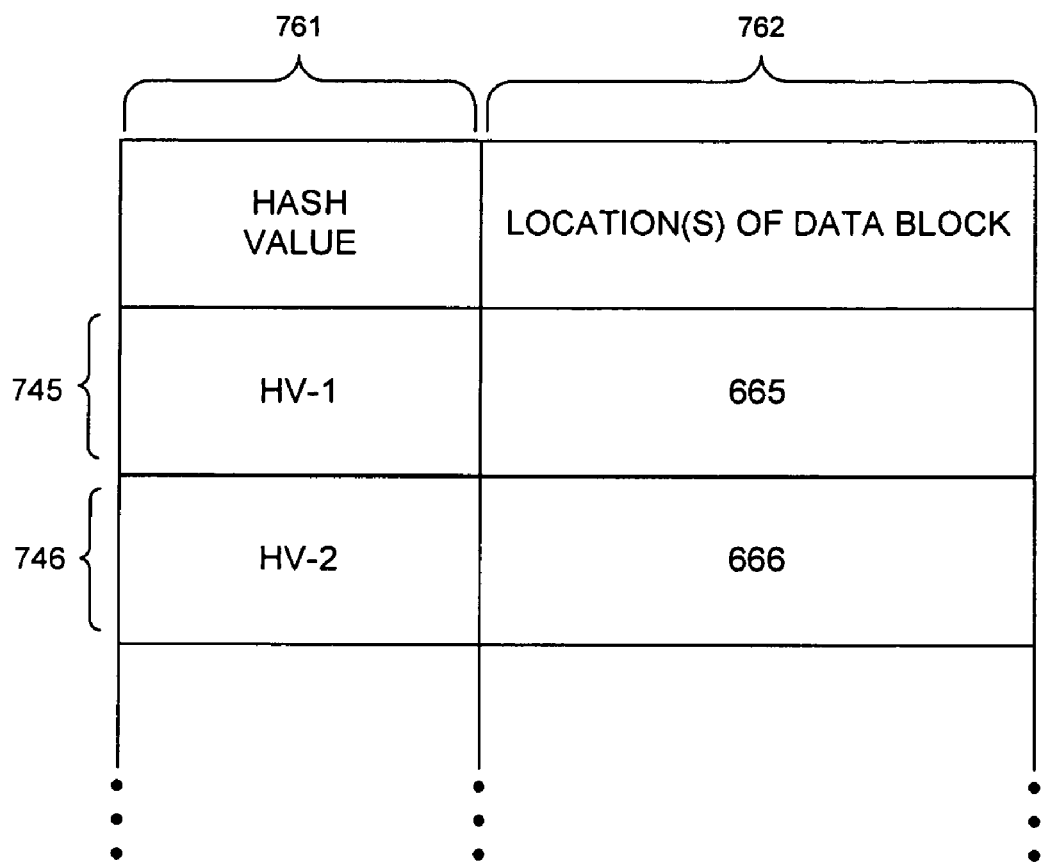
FIG. 7 is an example of a hash table that may be used to store hash values, in accordance with an embodiment of the invention.

The UDR manager 260 also initiates a hash table in memory. FIG. 7 is an example of a hash table 235 that may be used to store hash values, in accordance with an embodiment of the invention. The hash table 235 comprises a first column 761, which holds a hash value associated with a data file or data block, and a second column 762, which stores information indicating a location in the UDR 220 where the associated data file or data block is stored. In this example, the hash table 235 is stored in the storage device 215, as shown in FIG. 2. The hash table 235 is initiated as a table to store hash values (and location information); however, at this point the hash table 235 does not contain any data.

Figure 8A:
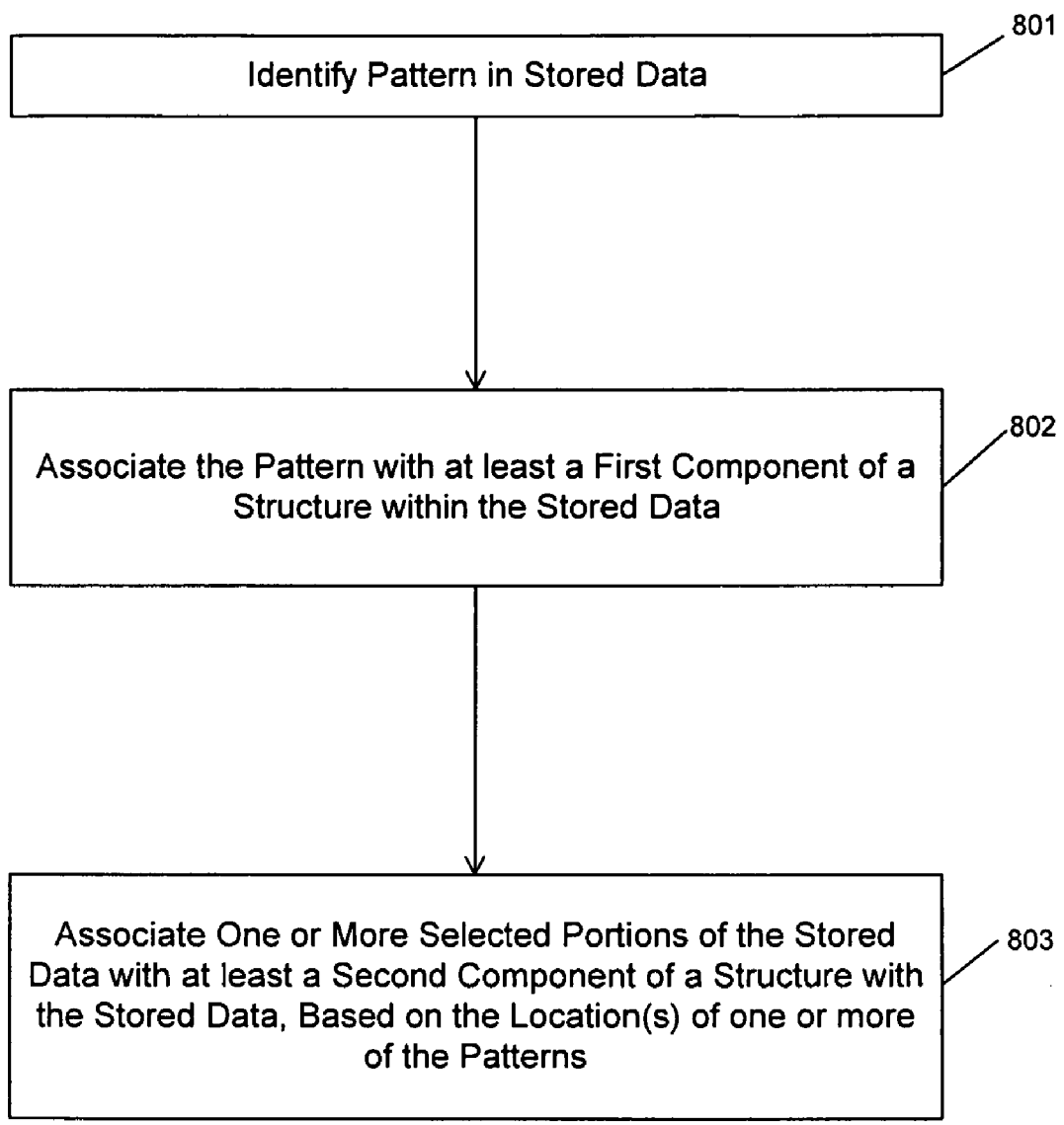
FIG. 8A is a flowchart of an example of a routine for identifying structures within stored data, in accordance with an embodiment of the invention.

FIG. 8A is a flowchart depicting a routine for identifying structures within stored data, in accordance with an embodiment of the invention. At step 801, a pattern is identified in data stored in a storage system. In the illustrative example discussed above, the data reduction system 160 examines the 20 MB of data shown in FIG. 5A, which is stored in the backup storage system 140, and identifies multiple occurrences of the data pattern 527. At step 802, the identified pattern is associated with at least a first component of a structure within the stored data. In the example, the data reduction system 160 determines that the pattern 527 defines a header section of a data file. At step 803, one or more selected portions of the stored data are associated with at least a second component of a structure, based on the locations of one or more of the patterns. Accordingly, the data reduction system 160 determines that the data block 533 comprises a data section of a data file, based on the locations of the first and second occurrences of the data pattern 527.

Figure 8B:
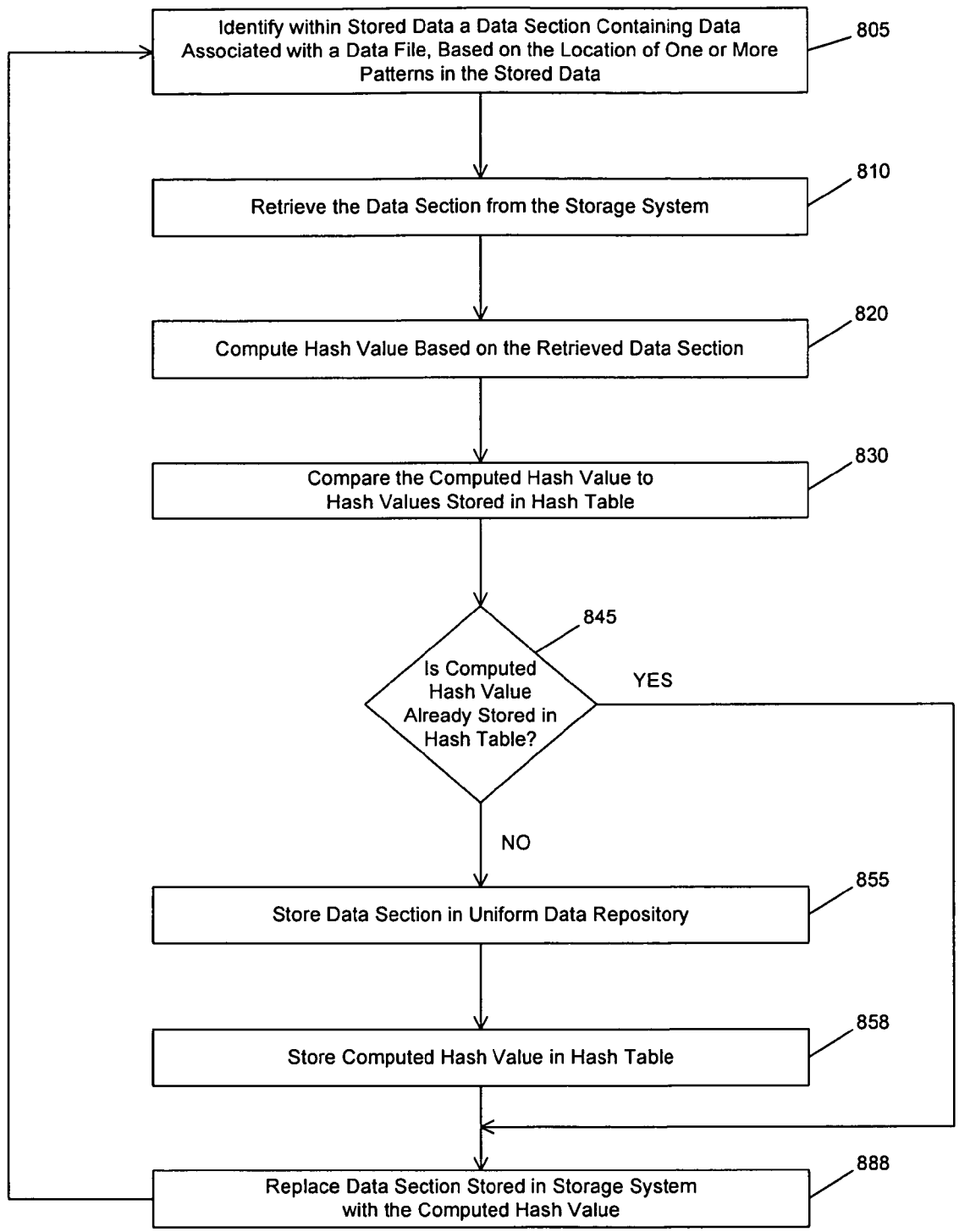
FIG. 8B is a flowchart of an example of a routine for reducing redundancies in stored data, in accordance with an embodiment of the invention.

FIG. 8B is a flowchart depicting a routine for reducing redundancies in stored data within a storage system, in accordance with an embodiment of the invention. Data stored in the backup storage system 140 is examined in the manner described above, and one or more patterns are identified within the data. At step 805, a data section containing data associated with a data file is identified within stored data in a storage system, based on the locations of one or more of the patterns. As discussed above, after the UDR manager 260 examines data stored in the backup storage system 140 and identifies multiple occurrences of the pattern 527 (shown in FIG. 5A), the UDR manager 260 determines that the data section 533 contains data associated with a data file. At step 810, the identified data section is retrieved from the storage system. Referring again to FIG. 5A, the UDR manager 260 retrieves the data section 533 from the backup storage system 140. In this example, only the data section 533 is retrieved; data associated with the pattern 527, which was been determined to comprise a header section, is not retrieved.

At step 820, a hash value is computed based on the retrieved data section. Thus, the UDR manager 260 computes a hash value, HV-1, based on the data section 533. At step 830, the computed hash value is compared to hash values stored in the hash table. Accordingly, the UDR manager 260 compares the computed hash value HV-1 to the hash values stored in the hash table 235. Because in this example the hash table 235 is currently empty, the computed hash value HV-1 is not found therein.

In accordance with block 845, if the computed hash value is already stored in the hash table 235, the routine proceeds to step 888. If, however, the computed hash value is not found in the hash table 235, the routine proceeds to step 855. Because, in the example, the computed hash value HV-1 is not found in the hash table 235, the routine proceeds to step 855.

At step 855, the data section is stored in the uniform data repository. Referring to FIG. 6, the UDR manager 260 stores the data section 533 in the UDR 220, in record 665. At step 858, the computed hash value is stored in the hash table. Referring to FIG. 7, the UDR manager 260 stores the computed hash value HV-1 in the hash table 235, in column 761 of record 745. In this example, the UDR manager 260 also records, in column 762 of record 745, information identifying the location in the uniform data repository where the data section 533 is stored. Thus, the UDR manager 260 stores the value "665" in column 762 of record 745, indicating that the data section 533 is stored in record 665 of the UDR 220.

Figure 9:
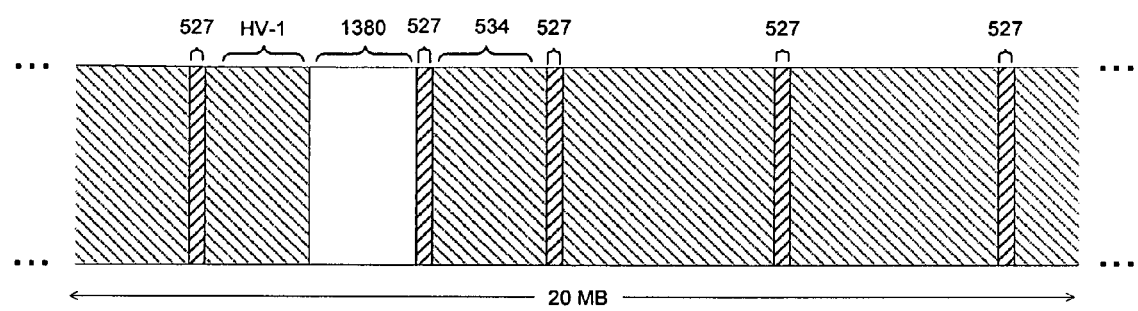
FIG. 9 shows the data of FIG. 5A in which a data section has been replaced by a hash value, in accordance with an embodiment of the invention.

At step 888, the data section in the storage system is replaced with the computed hash value. Thus (referring to FIG. 5A), the UDR manager 260 replaces the data section 533 in the backup storage system 140 with the computed hash value HV-1. FIG. 9 shows the 20 MB of stored data of FIG. 5A, in which the data section 533 has been replaced by the hash value HV-1. It is to be noted that the memory space 1380 is now unused.

The data section 533 may also be divided into two or more portions, and each portion is individually processed in the manner described above. Thus, for each respective portion of the data section 533, a separate hash value is computed, the hash table 235 is examined, and the computed hash value stored in the table 235 if the hash value is not already found therein. In this example, each respective portion of the data section 533 is replaced by the corresponding hash value. The respective portions are individually stored in the UDR 220. Alternatively, a sliding window or other such technique may be used to identify portions of the data section that may be identical to portions in the same or other data sections, by deriving a hash value from data within the window as the window advances, and comparing the resulting hash values to the values stored in the hash table 235. Other techniques for generating hash values based on all or part of an identified data section may be used, as well. A data section and its corresponding header section may also be treated as a unit. Thus, for example, the header information corresponding to the data section 533 may be retrieved along with the data section 533 and used to compute a hash value. In this example, each hash value in the hash table is derived from a unit comprising a header section and a corresponding data section.

Returning to FIG. 8B, after the data section in the storage system is replaced with the computed hash value, the routine may return to step 805, and another data section containing data associated with a data file may be identified. The routine may be repeated multiple times as desired, and/or until no data sections remain in the storage system.

For example, (referring again to FIG. 5A), the routine may return to step 805 and the data section 534 may be identified. Again, in accordance with the steps 810-888 described in FIG. 8, the data section is retrieved from the storage system 140, a hash value is computed based on the retrieved data section, and the computed hash value is compared to the hash values stored in the hash table. Supposing that in this example, a hash value HV-2 is computed based on the data section 534, and is not found in the hash table 235, the data section 534 is stored in the UDR 220. Referring to FIG. 6, the data section 534 is stored in the record 666. The hash value HV-2 is stored in the hash table 235, in the record 746. The data section 534 (in the storage system 140) is replaced by the hash value HV-2.

In one example of an application of embodiments of the invention, the identification of data sections, and substitution of hash values in place of the corresponding data sections mitigates redundancies within the data stored in the backup storage system 140. By applying the methods described herein to data stored in the backup storage system 140, for example, many data files may be removed and replaced by associated hash values. In particular, multiple, identical copies of certain data files are no longer stored in their entirety within the backup storage system 140, but are instead replaced by multiple copies of an associated hash value. Because hash values are in many cases significantly smaller in size than the respective data sections from which they are derived, the data reduction system 160 can in many cases use the methods described herein to increase the amount of unused memory in the backup storage system 140.

In another example of an embodiment of the invention, methods described herein may used to reduce redundancies with a storage system, such as a VTL, where the format of the stored data is known. In one example, data stored in a VTL is examined and a segment of data is identified. The segment of data may comprise a data file, for example. In accordance with methods described herein, a digest, such as a hash value, is generated based on the data file, and the data file stored in the VTL is replaced by the digest. The digest is also compared against digests stored in a table. If the digest is not found in the table, a copy of the data file is stored in a uniform data repository, and a copy of the digest is stored in the table. This procedure may be applied repeatedly to data files stored in the VTL. In this way, redundancies within the VTL may be mitigated, and the amount of unused memory in the VTL may be increased.

The foregoing merely illustrates the principles of the invention. It will thus be appreciated that those skilled in the art will be able to devise numerous other arrangements which embody the principles of the invention and are thus within its spirit and scope.

For example, the system 100 of FIG. 1 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. A computer implemented method to manage data comprising:
    examining a block of stored data on a tape library by a processing unit, the stored data comprising a plurality of data files, each data file comprising at least a header section and a data section, wherein the header section has an unknown format within the block;
    identifying at least two occurrences of a repeating pattern within the examined block of stored data, wherein the repeating pattern indicates at least one characteristic of the header section chosen from group consisting of: a location of the header section, a structure of the header section, a length of the header section, a beginning of the header section, and an end of the header section;
    based on the identification of the at least two occurrences, determining that the repeating pattern is at least a portion of a header section of a respective data file;
    identifying a data section of the respective data file based, at least in part, on a location of the at least a portion of the header section determined based on the identification of the at least two occurrences; and
    backing up the identified data section of the respective data file by the processing unit to a virtual tape library.

2. The method of claim 1, wherein the stored data is maintained on a tape storage medium.

3. The method of claim 1, wherein backing up the identified data section comprises:
    generating a first digest representing the identified data section;
    comparing the first digest to a set of second digests; and
    if the first digest is not found in the set of second digests:
    adding the first digest to the set of second digests;
    backing up the identified data section; and
    replacing the identified data section in the stored data by the first digest.

4. The method of claim 3, further comprising:
    if the first digest is found in the set of second digests, replacing the identified data section in the stored data by the first digest.

5. The method of claim 1, wherein the repeating pattern comprises a sequence of values.

6. The method of claim 5, wherein the sequence of values repeats identically within the data.

7. A system to manage data comprising:
    means for examining a block of stored data on a tape library, the stored data comprising a plurality of data files, each data file comprising at least a header section and a data section, wherein the header section has an unknown format;
    means for identifying a repeating pattern within the examined block of stored data, wherein the repeating pattern indicates at least one characteristic of the header section chosen from group consisting of: a location of the header section, a structure of the header section, a length of the header section, a beginning of the header section, and an end of the header section;

means for determining that the repeating pattern is at least a portion of a header section of a respective data file;

means for identifying a data section of the respective data file based, at least in part, on a location of the at least a portion of the header section determined based on the identified repeated pattern; and means for backing up the identified data section of the respective data file to a virtual tape library.

8. A system to manage data comprising:

a tape library memory located in a storage system, the memory being configured to store data; and a processing unit configured to:

examine a block of stored data comprising a plurality of data files, each data file comprising at least a header section and a data section, wherein the header section has an unknown format;

identify at least two occurrences of a repeating pattern within the examined block of stored data, wherein the repeating pattern indicates at least one characteristic of the header section chosen from group consisting of: a location of the header section, a structure of the header section, a length of the header section, a beginning of the header section, and an end of the header section;

based on the identification of the at least two occurrences, determine that the repeating pattern is at least a portion of a header section of a respective data file;

identify a data section of the respective data file based, at least in part, on a location of the at least a portion of the determined header section; and back up the identified data section of the respective data file to a virtual tape library.

9. The system of claim 8, wherein the processor is configured to back up the identified data section by:

comparing a first digest representing the data section to a set of second digests; and if the first digest is not found in the set of second digests:

storing the first digest;

storing at least a portion of the data section in a second storage location; and replacing the at least a portion of the data section stored in the storage system by the first digest.

10. The system of claim 9, wherein if the first digest is found in the set of second digests, the processor is configured to:

replace the identified data section in the stored data by the first digest.

11. The system of claim 8, wherein the processor is further configured to:

back up the identified data section in a second storage system different from the first storage system.

12. The system of claim 8, wherein the processor is further configured to:

identify a format of the data based at least in part on the repeating pattern.

13. The system of claim 8, wherein the repeating pattern comprises a sequence of values.

14. The system of claim 13, wherein the sequence of values repeats identically within the data.

15. The system of claim 13, wherein each occurrence of the repeating pattern comprises a sequence chosen from the group consisting of: a sequence of bits, and a sequence of bytes.

* * * * *